United States Patent
Chong et al.

(10) Patent No.: US 10,892,664 B2
(45) Date of Patent: Jan. 12, 2021

(54) SEGMENTED ELECTRICAL MACHINE

(71) Applicant: ROLLS-ROYCE plc, London (GB)

(72) Inventors: Ellis F H Chong, Derby (GB);
Shanmukha Ramakrishna, Singapore (SG); Vaiyapuri Viswanathan, Singapore (SG); Shuai Wang, Singapore (SG)

(73) Assignee: ROLLS-ROYCE plc, London (GB)

( * ) Notice: Subject to any disclaimer, the term of this patent is extended or adjusted under 35 U.S.C. 154(b) by 162 days.

(21) Appl. No.: 16/124,240

(22) Filed: Sep. 7, 2018

(65) Prior Publication Data
US 2019/0081532 A1   Mar. 14, 2019

(30) Foreign Application Priority Data

Sep. 14, 2017  (GB) .................................. 1714785.1

(51) Int. Cl.
*H02K 7/04* (2006.01)
*H02K 7/18* (2006.01)
(Continued)

(52) U.S. Cl.
CPC ............... *H02K 7/04* (2013.01); *F01D 15/00* (2013.01); *F01D 15/10* (2013.01); *H02K 1/246* (2013.01);
(Continued)

(58) Field of Classification Search
CPC .......... H02K 11/00; H02K 11/30; H02K 7/00; H02K 7/04; H02K 7/09; H02K 7/18;
(Continued)

(56) References Cited

U.S. PATENT DOCUMENTS 5,365,137 A * 11/1994 Richardson ............ H02K 1/141
310/112
5,672,925 A * 9/1997 Lipo .................... H02K 19/103
310/154.11
(Continued)

FOREIGN PATENT DOCUMENTS

EP  3035504    6/2016
EP  3261237 A1  12/2017
(Continued)

OTHER PUBLICATIONS

Extended Search Report from counterpart European Application No. 18189093.0, dated Feb. 12, 2019, 8 pgs.
(Continued)

*Primary Examiner* — Tran N Nguyen
(74) *Attorney, Agent, or Firm* — Shumaker & Sieffert, P.A.

(57) ABSTRACT

An electrical machine has a variable reluctance rotor, and a stator formed as an annular array of stator segments. The reluctance of the rotor-to-stator magnetic flux path varies with rotor position whereby the stator segments are magnetically energizable to rotate the rotor. The stator segments are arranged in the array such that, when energized to rotate the rotor, they produce an unbalanced force on the rotor. The machine further has a compensator including one or more balancing segments which are configured to be magnetically energizable to produce a balancing force on the rotor which balances the unbalanced force. The reluctance of the rotor-to-compensator magnetic flux path is substantially invariant with rotor position.

20 Claims, 7 Drawing Sheets

(51) Int. Cl.
     *H02K 7/09*      (2006.01)
     *F01D 15/10*     (2006.01)
     *H02K 19/10*     (2006.01)
     *H02K 11/30*     (2016.01)
     *F01D 15/00*     (2006.01)
     *H02K 1/24*      (2006.01)
     *H02K 41/03*     (2006.01)
     *F01D 5/02*      (2006.01)
     *H02K 1/14*      (2006.01)
     *F02C 7/268*     (2006.01)
     *F02C 7/32*      (2006.01)

(52) U.S. Cl.
     CPC ............. *H02K 7/09* (2013.01); *H02K 7/1823* (2013.01); *H02K 11/30* (2016.01); *H02K 19/103* (2013.01); *F01D 5/027* (2013.01); *F02C 7/268* (2013.01); *F02C 7/32* (2013.01); *F05D 2220/323* (2013.01); *F05D 2220/768* (2013.01); *F05D 2260/96* (2013.01); *H02K 1/148* (2013.01); *H02K 41/03* (2013.01); *H02K 2201/15* (2013.01); *H02K 2213/12* (2013.01)

(58) Field of Classification Search
     CPC ........ H02K 7/182; H02K 7/1823; H02K 1/14; H02K 1/24; H02K 1/246; H02K 19/00; H02K 19/02; H02K 19/10; H02K 19/103; H02K 19/16; H02K 19/20; H02K 19/24; F01D 15/00; F01D 15/10
     See application file for complete search history.

(56) References Cited

U.S. PATENT DOCUMENTS 6,121,711 A      9/2000  Nakahara et al.
2015/0295456 A1* 10/2015 Michaelides ........ H02K 41/031
                                                    310/156.01

FOREIGN PATENT DOCUMENTS

GB        2511353 A       3/2014
GB        2508022         5/2014
WO     2006051318 A1      5/2006

OTHER PUBLICATIONS

Response to Extended Search Report from counterpart European Application No. 18189093.0, dated Feb. 12, 2019, filed Jul. 1, 2019, 32 pgs.

Great Britain Search Report dated Mar. 6, 2018, issued in GB Patent Application No. 1714785.1.

* cited by examiner

SEGMENTED ELECTRICAL MACHINE

CROSS-REFERENCE TO RELATED APPLICATIONS

This application is based upon and claims the benefit of priority from British Patent Application No. GB 1714785.1, filed on 14 Sep. 2017, the entire contents of which are herein incorporated by reference.

BACKGROUND

Technical Field

The present disclosure relates to a segmented electrical machine. In particular, but not exclusively, it relates to a segmented electrical machine to be mounted in a gas turbine engine or other rotating assembly.

Description of the Related Art EP A 3035504 proposes an electrical machine having a variable reluctance rotor and an annular array of stator segments which are each configured to function, in conjunction with the rotor, as an electrical machine. Advantageously, the variable reluctance rotor can be integrated with or mounted to the radial periphery of a rotor stage, or a pair of axially spaced rotor stages, of a gas turbine engine, whereby the weight of the machine and the number of its components can be reduced relative to more conventional electrical machines associated with gas turbine engines.

In particular, by breaking down a whole annular stator into circumferentially distributed segments, with each segment respectively sized according to the available space and required electrical load, the available space in the gas turbine engine can be utilized more efficiently. Moreover, each stator segment can be individually removed or replaced, facilitating maintenance.

Figure 1:
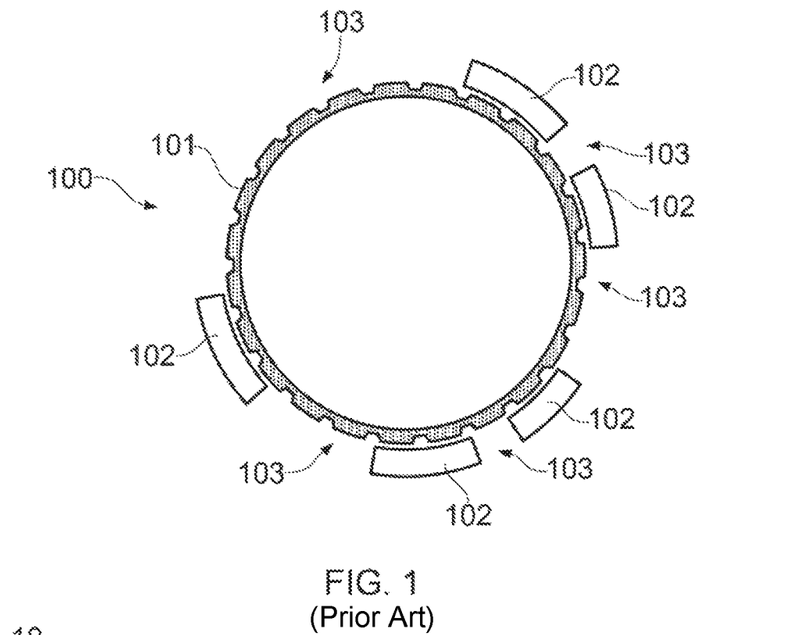
FIG. 1 shows schematically a transverse cross-section through an electrical machine.

FIG. 1 shows schematically a transverse cross-section through such an electrical machine 100 having a single variable reluctance rotor 101, and plural external stator segments 102. These are non-axisymmetrically distributed so that existing pipes and cables of the gas turbine engine can be accommodated in the spaces 103 between the stator segments. However, because the stator segments are non-axisymmetrically distributed, they exert a radial unbalanced magnetic force (UMF) on the variable reluctance rotor when the machine is operated as a motor. Similarly when the machine is operated as a generator, if the electrical loads of the stator segments are unevenly distributed these will exert a radial UMF on the rotor, even if the segments are axisymmetrically distributed.

The UMF can be several orders of magnitude greater than the torque-producing forces acting in the tangential direction. As a consequence, increased shaft eccentricities and bearing friction can considerably decrease bearing life. Moreover, the UMF can serve as external excitation source for rotor vibrations such that, when close to system resonant frequencies, severe deformation can occur.

SUMMARY

In general terms, the present disclosure aims to address the UMF in segmented electrical machines by active compensation.

Accordingly, in a first aspect, the present disclosure provides an electrical machine having:
a variable reluctance rotor, and
a stator formed as an annular array of stator segments, the reluctance of the rotor-to-stator magnetic flux path varying with rotor position whereby the stator segments are magnetically energizable to rotate the rotor;
wherein:
the stator segments are arranged in the array such that, when energized to rotate the rotor, they produce an unbalanced force on the rotor; and
the machine further has a compensator including one or more balancing segments which are configured to be magnetically energizable to produce a balancing force on the rotor which balances the unbalanced force, the reluctance of the rotor-to-compensator magnetic flux path being substantially invariant with rotor position.

Advantageously, the compensator can compensate for a UMF with a rapid response time, and an operation that, because of the invariance of the reluctance of the rotor-to-compensator magnetic flux path, is independent of the operation of the stator segments. Moreover, the compensator can achieve high force densities, and have a low power requirement and a high operational reliability.

In a second aspect, the present disclosure provides a gas turbine engine including an electrical machine according to the first aspect. For example, the variable reluctance rotor can be integrated with or mounted to a rotor stage, or a pair of axially spaced rotor stages, of the gas turbine engine.

Optional features of the present disclosure will now be set out. These are applicable singly or in any combination with any aspect of the present disclosure.

The unbalanced force may be radial or may include a radial component. The unbalanced force may be axial or may include an axial component. Accordingly, the unbalanced force may include a radial component and an axial component.

The stator segments may be non-axisymmetrically distributed in the annular array. Additionally or alternatively, the stator segments may have unequal electrical loads when magnetically energized to rotate the rotor.

The, or each, balancing segment may typically have a core structure (e.g. formed of magnetically permeable material) and a conductor winding mounted to the core structure, which conductor winding is electrically excitable to magnetically energize the balancing segment. Additionally or alternatively, the or each, balancing segment may incorporate a permanent magnet to magnetically energize the balancing segment.

Conveniently, the core structure of the, or each, balancing segment may have plural salient teeth projecting towards the rotor and arranged in a row which extends to either side of the conductor winding. To produce the substantially invariant reluctance of the rotor-to-compensator magnetic flux path, the teeth may be unequally spaced to either side of the conductor winding and/or the teeth may be of unequal width to either side of the conductor winding. The, or each, balancing segment may have its conductor winding centrally located relative to the row of teeth. The direction of the row, or a component of the direction of the row, may be aligned with the circumferential direction of the rotor to balance a radial unbalanced force or a radial component of the unbalanced force. Similarly, the direction of the row, or a component of the direction of the row, may be aligned with the axial direction of the rotor to balance an axial unbalanced force or an axial component of the unbalanced force.

Additionally or alternatively, to produce the substantially invariant reluctance of the rotor-to-compensator magnetic flux path, the core structure of the, or each, balancing segment may form air gaps with the rotor of unequal thickness to either side of the conductor winding.

Additionally or alternatively, to produce the substantially invariant reluctance of the rotor-to-compensator magnetic flux path, the core structure of the, or each, balancing segment may extend by different distances to either side of the conductor winding.

The core structure of the, or each, balancing segment may be an E-core structure or a U-core structure. In the case of a U-core structure, the conductor winding may have a thinner layer of conductors on a side of the winding distal from the rotor than on a side of the winding proximal the rotor. This can help to reduce the space requirement of the balancing segment.

When the compensator has plural balancing segments, adjacent balancing segments may have their respective core structures formed as a unitary body.

The stator and the compensator can be external or internal to the rotor.

The electrical machine may further have a control system for controlling the compensator to produce the balancing force. The control system may include a respective super capacitor in parallel with a conductor winding of the, or each, balancing segment of the compensator.

Examples of applications of the electrical machine include: embedded starter/generators, engine fuel pumps and hybrid propulsion systems in which the unevenness of available space as well as the low accessibilities of embedding locations pose challenges to conventional annular stator electrical machines.

DESCRIPTION OF THE DRAWINGS

Embodiments of the present disclosure will now be described by way of example with reference to the accompanying drawings in which.

DETAILED DESCRIPTION

Figure 2:
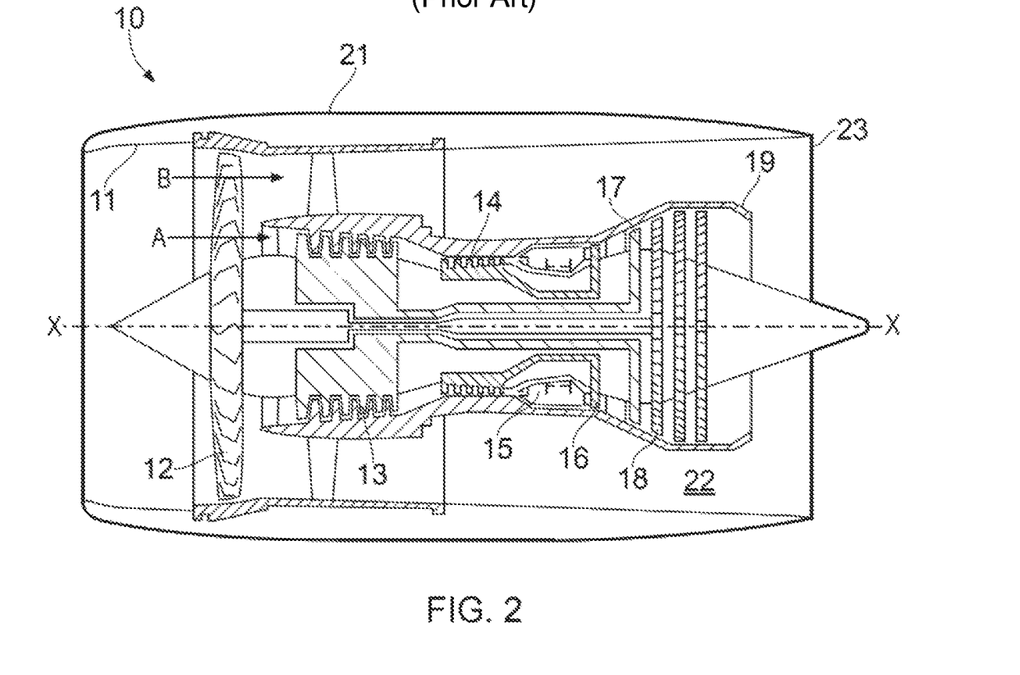
FIG. 2 shows a longitudinal cross-section through a ducted fan gas turbine engine.

With reference to FIG. 2, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

The engine has at least one segmented electrical machine, e.g. of the type discussed in EP A 3035504. However, the circumferentially distributed stator segment array of such a machine can produce a UMF when the segments are unevenly spatially distributed and/or operate under uneven electrical loads. The UMF transfers to the engine shaft and bearings, potentially increasing shaft eccentricity levels and shrinking bearing life. Moreover, the UMF may have frequencies close to the resonant frequencies of the rotary system, potentially causing excessive vibrations. Therefore, to counteract the UMF the machine has an active compensator.

Figure 3:
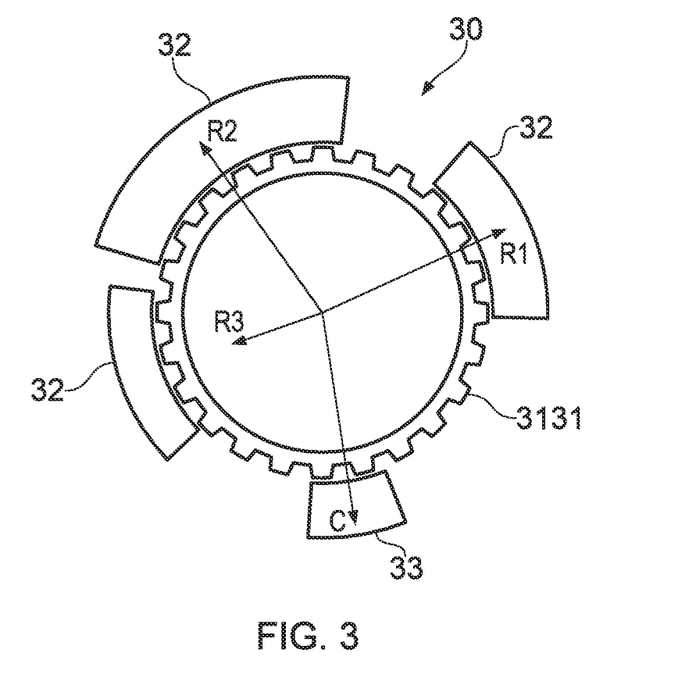
FIG. 3 shows schematically a transverse cross-section through an electrical machine.

Specifically, the compensator has one or more dedicated balancing segment(s) to exert counter forces on the variable reluctance rotor of the electrical machine in such a way that the net radial force experienced by the rotor is zero or substantially reduced, as depicted as in FIG. 3, which shows schematically a transverse cross-section through an example of the electrical machine 30. The variable reluctance rotor 31 of the machine is surrounded by a stator formed as an annular array of three stator segments 32. The overall reluctance of the rotor-to-stator magnetic flux path varies with rotor position so that the stator segments are magnetically energizable to rotate the rotor. However, this energization causes the stator segments to exert respective radial forces, R1-R3, on the rotor. In combination these forces produce a radial UMF. To counteract this force, the compensator of the machine has a balancing segment 33 which is magnetically energizable to produce a balancing force C on the rotor. In vector terms, $\sqrt{C}=-(\sqrt{R1}+\sqrt{R2}+\sqrt{R3})$. However, the reluctance of the rotor-to-compensator magnetic flux path is invariant with rotor position such that the compensator does not affect the operation of the machine.

Quantitatively the respective unbalanced magnetic pull R on the variable reluctance rotor 31 resulting from each stator segment 32 can be estimated by integrating the Maxwell stress tensor over the covered air gap area S as shown in the following equation:

$$R = \frac{B^2 S}{2\mu_0}$$

where B is the magnetic flux density and $\mu_0$ is the permeability of free space. Compensating the unbalanced magnetic pull R therefore requires inducing adequate magnetic flux density B over the air-gap area of the balancing segment 33.

To achieve this while also maintaining the reluctance of the rotor-to-compensator magnetic flux path invariant with rotor position, the balancing segment 33 can take various forms.

Figure 4:
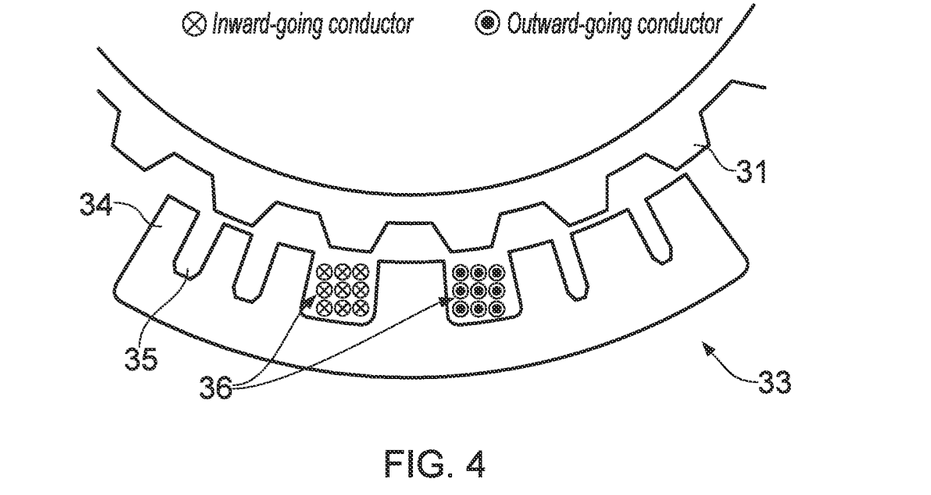
FIG. 4 shows schematically an asymmetrical E-core geometry for a balancing segment of a compensator of the machine of FIG. 3.

One option, show in FIG. 4, is to adopt an asymmetrical E-core geometry for the balancing segment 33 in which the segment has a row of salient teeth 34 projecting towards the rotor. To provide a flux path which is invariant with rotor position, the teeth can have unequal tooth widths and/or unequal spacings 35. The segment has a centrally located and concentrated conductor winding 36. When electrical excitation is applied to the conductor winding, a magnetic field establishes in the air gap between the segment and the rotor 31 with varying magnitude depending on the local tooth width and tooth spacing. By appropriately shaping the teeth profiles, UMFs of different magnitudes and directions can be effectively compensated.

To determine an appropriate form for the compensator, the unbalanced magnetic pull vector over the rotor 31 due to the stator during all possible conditions can first be estimated. The net magnitude and angular span of the net unbalanced magnetic pull can then be used to configure the compensator.

Figure 5:
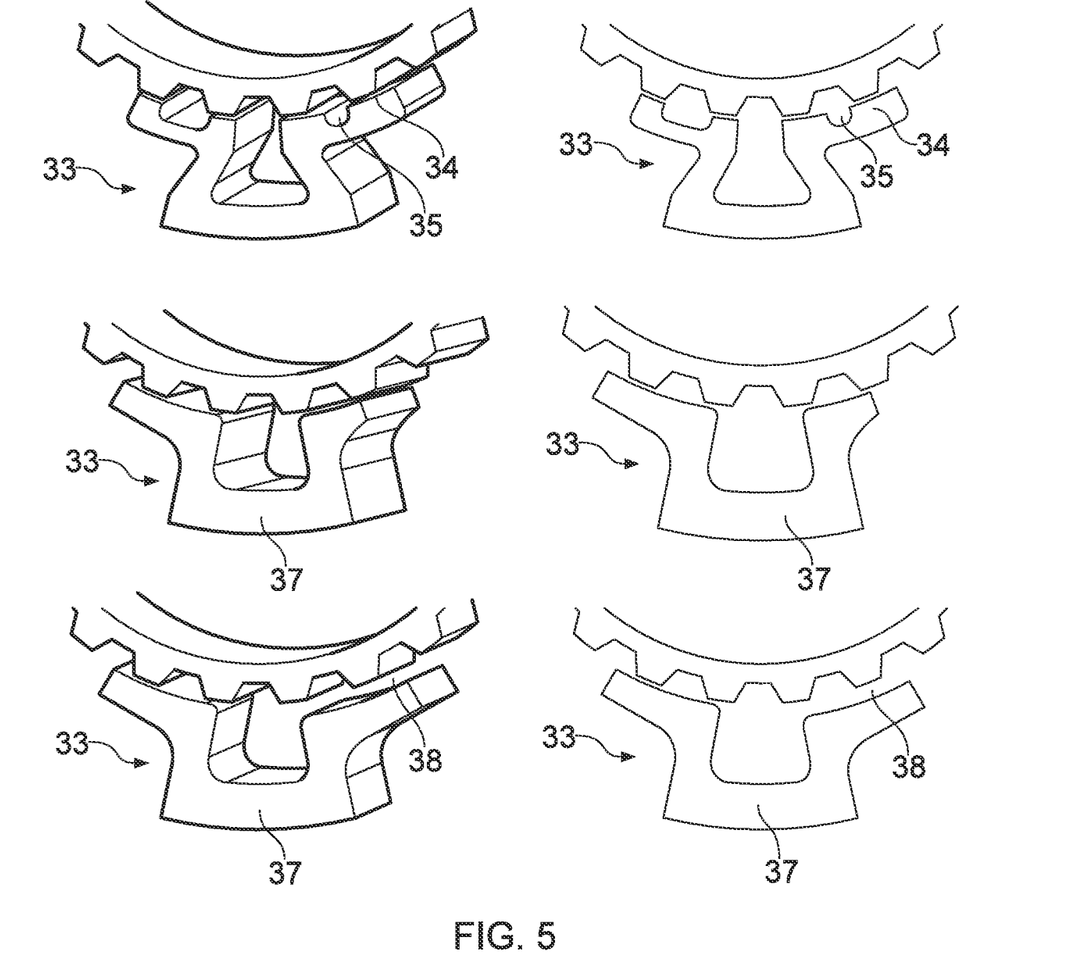
FIG. 5 shows schematically at left perspective views and at right transverse cross-sections of three different possible U-core geometries (respectively top, middle and bottom) for a balancing segment of the compensator of the machine of FIG. 3.

Other options are possible for the configuration of the balancing segment 33. For example, instead of an E-core geometry, the segment can have a U-core geometry. As another example, whether it has salient teeth or not, the segment can extend circumferentially to different distances either side of the winding structure. As yet another example, the segment can have a varying air gap thickness. These different possibilities are applicable individually or in combination, and FIG. 5 shows schematically at left perspective views and at right transverse cross-sections of just three different possible geometries (top, middle and bottom) for the balancing segment. By applying different geometries, magnetic pulls with varying magnitudes and directions can be compensated. At top in FIG. 5, the balancing segment 33 has a U-core geometry and salient teeth 34 with unequal tooth widths and unequal tooth spacings 35. At middle in FIG. 5, the segment 33 has no salient teeth, but has different circumferential spans of the U-core to either side of the winding portion 37 of the U-core. At bottom in FIG. 5, the segment has no salient teeth, but has different air gaps 38 to either side of the winding portion 37 so that the net magnetic pull vector lies to the small air gap side of the U-core central line, i.e. although the air gap area is identical on each side, the magnetic flux density distributions differ and hence the generated magnetic pulls differ.

Figure 6:
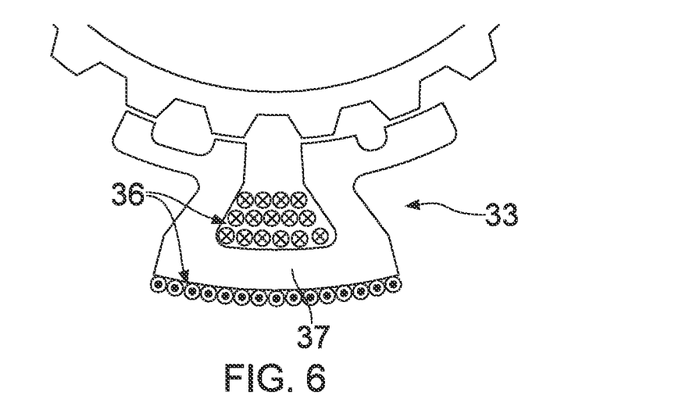
FIG. 6 is another schematic transverse cross-section of the balancing segment shown at top in FIG. 5 but including a conductor winding.

FIG. 6 is another schematic transverse cross-section of the U-core geometry balancing segment 33 shown at top in FIG. 5, but also includes the conductor winding 36 of the segment. Advantageously, by spreading the conductors of the winding on the outer side of the winding portion 37 into a thinner layer, the space requirement of the segment can be reduced. The thinner layer also increases the cooling area for the conductors, therefore facilitating higher electrical excitations and correspondingly higher force densities. The converter rating for the segment is also low.

Figure 7:
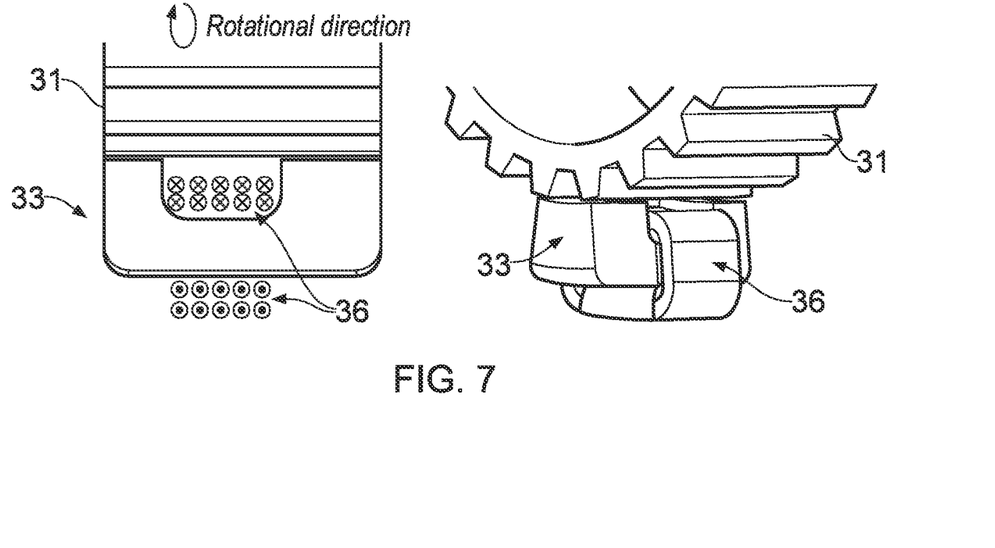
FIG. 7 shows schematically at left a transverse cross-section and at right a perspective views of a further possible U-core geometries for a balancing segment of the compensator.
Figure 8:
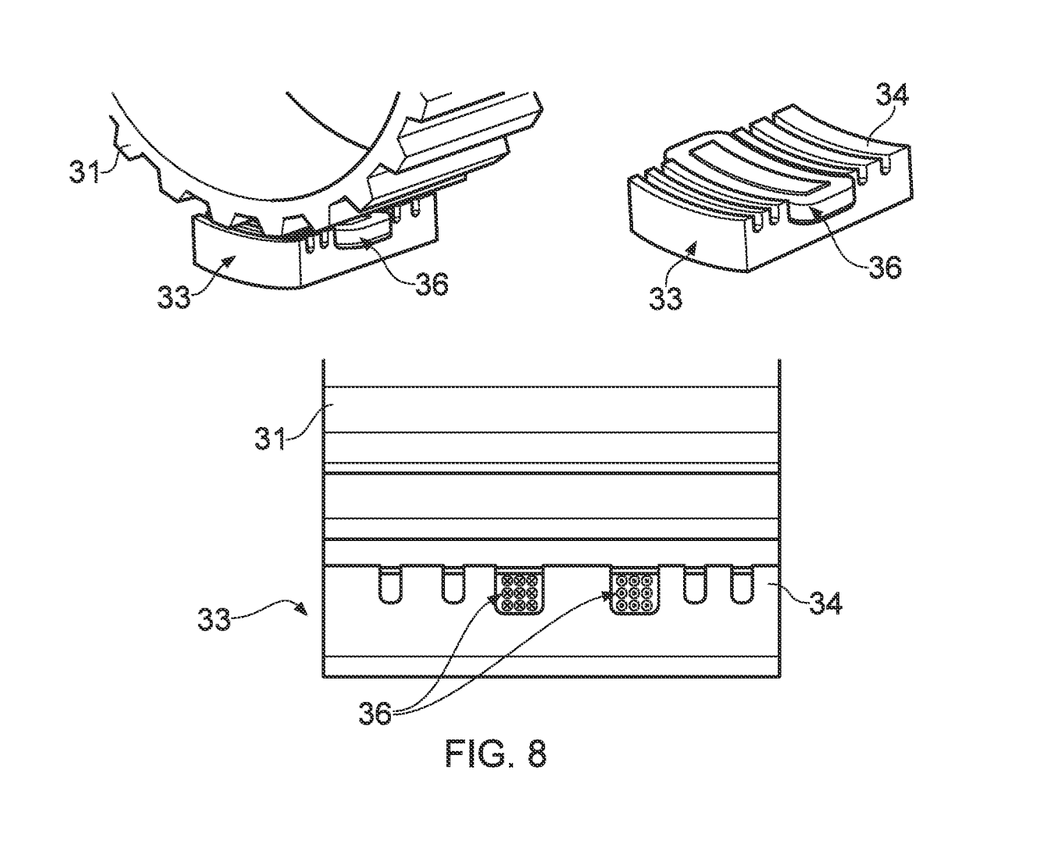
FIG. 8 shows schematically at top left a perspective cross-section, at top right a perspective view without the rotor, and at bottom centre a transverse cross-section of a further possible E-core geometry for a balancing segment of the compensator.

As an alternative to compensating radial UMFs, the balancing segment or segments of the compensator can compensate unbalanced magnetic pulls in axial directions. FIGS. 7 and 8 illustrate how this can be achieved for U-core and E-core geometries. In particular, FIG. 7 shows schematically at left a transverse cross-section and at right a perspective view of a possible U-core geometry for a balancing segment, while FIG. 8 shows schematically at top left a perspective view of a possible E-core geometry for a balancing segment, at top right a perspective view of the E-core geometry without the rotor, and at bottom centre a transverse cross-section of the E-core geometry. The U-core geometry balancing segment 33 of FIG. 7 has different axial spans of the U-core to either side of the conductor winding 36 of the segment. The E-core geometry balancing segment 33 of FIG. 8 also has different axial spans of the E-core to either side of the conductor winding 36, but in addition has an axially extending row of salient teeth 34 with unequal tooth widths and unequal tooth spacings 35. Other structures (e.g. different air gaps to either side of the winding portion), or combinations of structures, for the balancing segment to achieve force compensation and an invariant reluctance rotor-to-compensator magnetic flux path are possible, i.e. by analogy with the balancing segments discussed above in respect of FIGS. 5 and 6.

The compensator can also balance an unbalanced force which has both radial and axial components. This can be achieved by a subset of balancing segment(s) balancing just radial UMFs, and another subset of balancing segment(s) balancing just axial UMFs. Another option is to configure the balancing segment(s) of the compensator (e.g. by implementing appropriate combinations of radial-compensating and axial-compensating structures) so that a given segment balances both radial and axial components of a UMF.

An advantage of the compensator includes the capability to compensate 3D unbalanced magnetic pulls with rapid responses, e.g. by using fast-acting DC current excitations. Also the compensator can provide independent operation from the stator segments 32, since its magnetic flux circulation can be confined locally, thereby avoiding interference with the stator. In addition, the compensator can be based on relatively simple structures, which promotes reliability and facilitates integration into gas turbine engines or other rotary assemblies.

Figure 9:
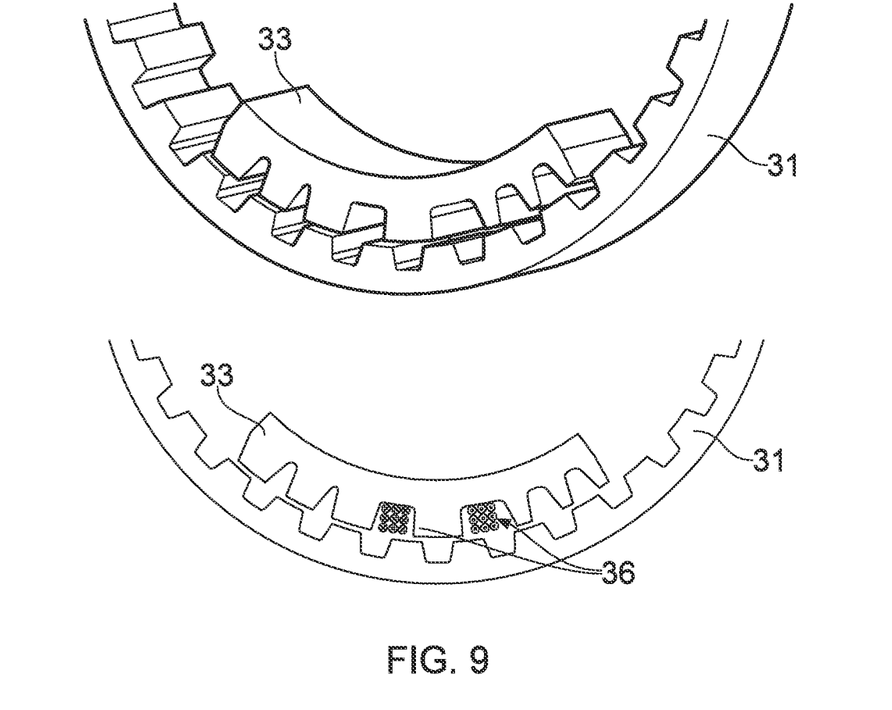
FIG. 9 shows schematically at top a perspective view and at bottom a transverse cross-section of a balancing segment of the compensator for an outer runner rotor.

Although described above in relation to an inner runner rotor 31, the compensator can also be applied to an outer runner rotor. Thus FIG. 9 shows schematically at top a perspective view and at bottom a transverse cross-section of a toothed, E-core balancing segment 33 for a racially outer variable reluctance rotor 31.

Figure 10:
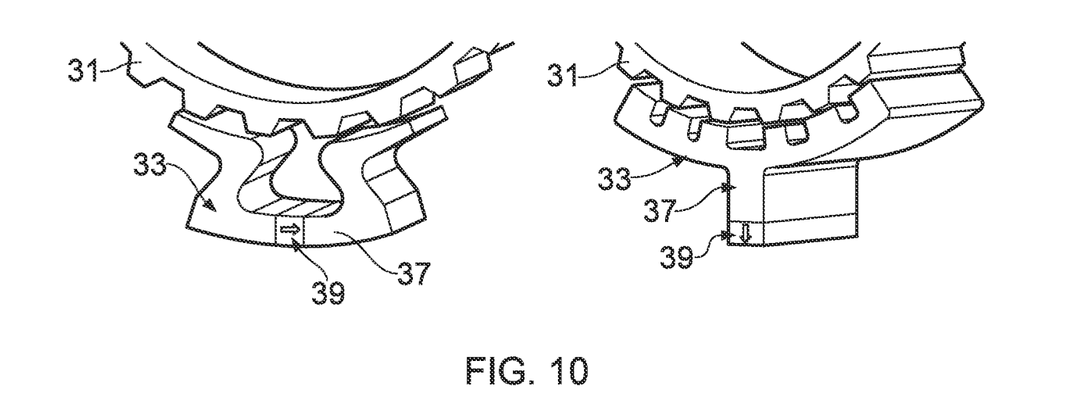
FIG. 10 shows schematically perspective views of at left a U-core balancing segment incorporating a permanent magnet and at right an E-core balancing segment incorporating a permanent magnet.

Another possibility is to incorporate permanent magnets in the balancing segments to enhance the force compensation capability of the segments. This is illustrated in FIG. 10 at left for a U-core balancing segment having a permanent magnet 39 at the winding portion 37 of the core, and at right for an E-core balancing segment also having a permanent magnet 39 at the winding portion 37 of the core. The permanent magnet can effectively reduce the required excitation current for the same magnitude of UMF compensation.

Figure 11:
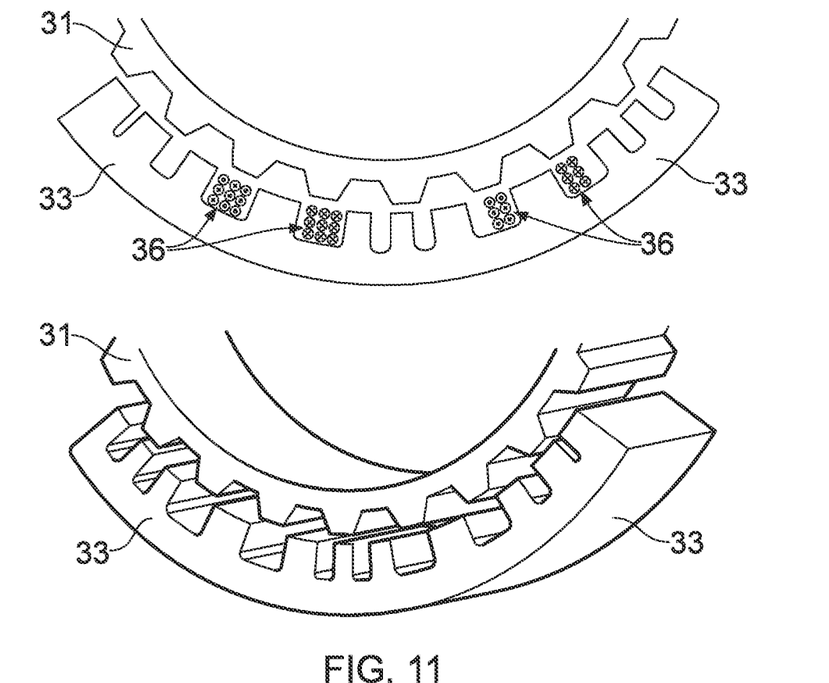
FIG. 11 shows schematically at top a transverse cross-section and at bottom a perspective view of two adjacent E-core balancing segments having merged cores.

Yet another possibility is to form the cores of adjacent balancing segments as a unitary body. Thus FIG. 11 shows at top a transverse cross-section and at bottom a perspective view of two adjacent E-core balancing segments 33 whose cores are merged in this way. The windings 36 for the two segments can have unequal turn counts and be excited with different current magnitudes to produce the required overall magnetic compensating force vector.

Returning then to the produced balancing force C on the rotor, discussed above in relation to FIG. 3, assuming all three stator segments 32 are turned on and are under full loads, the balancing segment 33 is configured to produce the equal but opposite balancing force C on the rotor to compensate the unbalanced radial force produced by the stator segments. This can be achieved by a unipolar excitation of the windings of the balancing segment with constant DC electrical current.

If the stator segments 32 are turned on but are under partial loads, such as for example all three stator segments are generating at 50% of their respective nominal loads, the radial forces R1-R3 generate a net unbalanced radial force which is the same as that shown in FIG. 3 in terms of direction but is at half the magnitude. Thus a unipolar DC electrical current excitation can again be applied to the windings of the balancing segment 33 but at a suitably reduced magnitude of constant DC electrical current.

Under transient or uneven load conditions (e.g. if two of the stator segments 32 are at full load while the other is turned off, or if all three stator segments are operating at different percentages of partial loading with respect to their nominal loads), then a different excitation and control method for the balancing segment 33 can be adopted.

Figure 12:
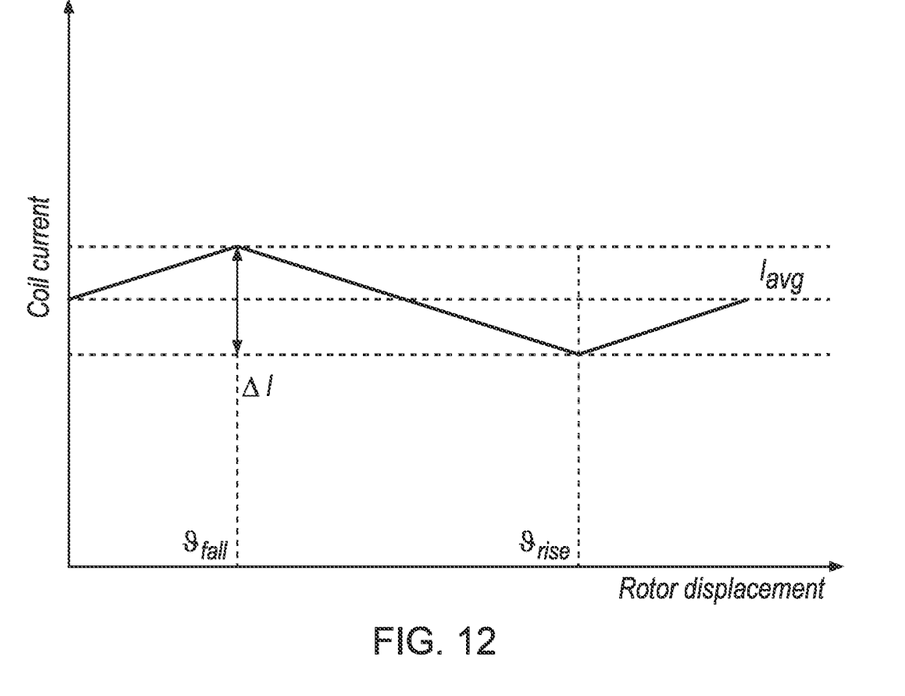
FIG. 12 shows schematically an example saw tooth current waveform.
Figure 13:
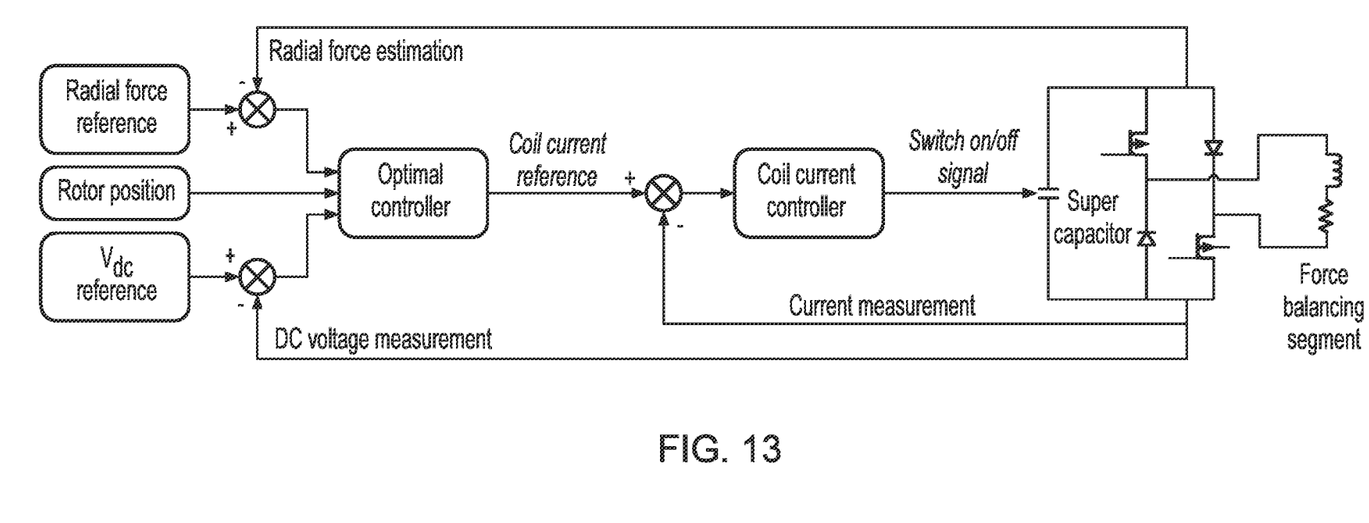
FIG. 13 shows schematically a control system for autonomous operation of a force balancing segment.

For example, by profiling a non-constant excitation current with small ripple magnitude, illustrated in FIG. 12 as e.g. a saw tooth current with an excitation current ripple of magnitude ΔI and having a phase relative position rotor positions $\theta_{fall}$ and $\theta_{rise}$, an active reluctance force can be obtained, which can be combined with the unipolar excited force to form a vectorial compensating force. Under most conditions, the active reluctance force can support and mitigate any transient or uneven load conditions. FIG. 13 depicts an example of a possible control scheme for the balancing segment 33. With a highly capacitive element, such as a super capacitor connected as shown in the control schematic, a first (lower, as depicted) closed-loop controls the DC voltage by manipulating the excitation current ripple magnitude ΔI and its relative position with respect to $\theta_{fall}$ and $\theta_{rise}$ as the controlled variable. In a second (upper, as depicted) closed-loop, an average excitation current reference is determined from an estimate of the radial shaft force. An optimal controller then combines the two control-loops to issue a single coil current reference. An inner excitation coil current controller (which can be based on e.g. proportional-integral, hysteresis, fuzzy logic or heuristic algorithms) regulates the excitation current and hence the appropriate amount of vectorial force to compensate for any transient or uneven force.

The approach discussed above for compensating UMFs is applicable across segmental electrical machine applications in gas turbine engines or other rotary assemblies. In particular, when the available spatial envelop for the stator is non-uniform and requires segmenting the electrical machine into unequal elements, the compensator becomes beneficial. Potential applications include aerospace and marine embedded generators, aerospace hybrid propulsion systems, all electrical ships and hybrid electric vehicles.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An electrical machine having:
   a variable reluctance rotor, and
   a stator formed as an annular array of stator segments, wherein reluctance of the rotor-to-stator magnetic flux path varies with rotor position, and wherein the stator segments are magnetically energizable to rotate the rotor;
   wherein:
      the stator segments are non-axisymmetrically distributed in the array such that, when energized to rotate the rotor, the stator segments produce an unbalanced force on the rotor; and
      the electrical machine further has a compensator including one or more balancing segments, each balancing segment comprising a core structure and a conductor winding mounted to the core structure, the winding being configured to be magnetically energizable by electrical excitation by a control system to produce a balancing force on the rotor, wherein the balancing force balances the unbalanced force, wherein reluctance of a rotor-to-compensator magnetic flux path is substantially invariant with rotor position.

2. The electrical machine according to claim 1, wherein the unbalanced force is radial or includes a radial component.

3. The electrical machine according to claim 1, wherein the unbalanced force is axial or includes an axial component.

4. The electrical machine according to claim 1, wherein the core structure of each of the one or more balancing segments has plural salient teeth projecting towards the rotor and arranged in a row that extends to either side of the conductor winding, and
   wherein, to produce the substantially invariant reluctance of the rotor-to-compensator magnetic flux path, the teeth are unequally spaced to either side of the conductor winding and/or the teeth are of unequal width to either side of the conductor winding.

5. The electrical machine according to claim 1, wherein, to produce the substantially invariant reluctance of the rotor-to-compensator magnetic flux path, the core structure of each of the one or more balancing segments forms air gaps with the rotor of unequal thickness to either side of the conductor winding.

6. The electrical machine according to claim 1, wherein, to produce the substantially invariant reluctance of the rotor-to-compensator magnetic flux path, the core structure of each of the one or more balancing segments extends by different distances to either side of the conductor winding.

7. The electrical machine according to claim 1, wherein the core structure of each of the one or more balancing segments is an E-core structure.

8. The electrical machine according to claim 1, wherein the core structure of each of the one or more balancing segments is a U-core structure.

9. The electrical machine according to claim 8, wherein the conductor winding has a thinner layer of conductors on a side of the winding distal from the rotor than on a side of the winding proximal the rotor.

10. The electrical machine according to claim 1, wherein each of the one or more balancing segments incorporates a permanent magnet.

11. The electrical machine according to claim 1, further having the control system for controlling the compensator to produce the balancing force.

12. A gas turbine engine including an electrical machine comprising:
a variable reluctance rotor, and
a stator formed as an annular array of stator segments, wherein reluctance of the rotor-to-stator magnetic flux path varies with rotor position, and wherein the stator segments are magnetically energizable to rotate the rotor;
wherein:
the stator segments are non-axisymmetrically distributed in the array such that, when energized to rotate the rotor, the stator segments produce an unbalanced force on the rotor; and
the electrical machine further has a compensator including one or more balancing segments, each balancing segment comprising a core structure and a conductor winding mounted to the core structure, the winding being configured to be magnetically energizable by electrical excitation by a control system to produce a balancing force on the rotor, wherein the balancing force balances the unbalanced force, wherein reluctance of a rotor-to-compensator magnetic flux path is substantially invariant with rotor position.

13. The gas turbine engine according to claim 12, wherein the unbalanced force is radial or includes a radial component.

14. The gas turbine engine according to claim 12, wherein the unbalanced force is axial or includes an axial component.

15. The gas turbine engine according to claim 12, wherein the core structure of each of the one or more balancing segments has plural salient teeth projecting towards the rotor and arranged in a row that extends to either side of the conductor winding, and
wherein, to produce the substantially invariant reluctance of the rotor-to-compensator magnetic flux path, the teeth are unequally spaced to either side of the conductor winding and/or the teeth are of unequal width to either side of the conductor winding.

16. The gas turbine engine according to claim 12, wherein, to produce the substantially invariant reluctance of the rotor-to-compensator magnetic flux path, the core structure of each of the one or more balancing segments forms air gaps with the rotor of unequal thickness to either side of the conductor winding.

17. The gas turbine engine according to claim 12, wherein, to produce the substantially invariant reluctance of the rotor-to-compensator magnetic flux path, the core structure of each of the one or more balancing segments extends by different distances to either side of the conductor winding.

18. The gas turbine engine according to claim 12, wherein the core structure of each of the one or more balancing segments is an E-core structure.

19. The gas turbine engine according to claim 12, wherein the core structure of each of the one or more balancing segments is a U-core structure.

20. The gas turbine engine according to claim 19, wherein the conductor winding has a thinner layer of conductors on a side of the winding distal from the rotor than on a side of the winding proximal the rotor.

* * * * *